United States Patent [19]

Mizunoe et al.

[11] Patent Number: 4,641,296
[45] Date of Patent: Feb. 3, 1987

[54] OPTICAL HEAD FOR INFORMATION RECORDING APPARATUS

[75] Inventors: Katsumi Mizunoe, Yokohama; Junichi Yanai; Kiyoshi Kimoto, both of Tokyo, all of Japan

[73] Assignee: Nippon Kogaku K.K., Tokyo, Japan

[21] Appl. No.: 603,655

[22] Filed: Apr. 25, 1984

[30] Foreign Application Priority Data

Apr. 28, 1983 [JP] Japan .................................. 58-73908
Jun. 16, 1983 [JP] Japan ................................ 58-108315

[51] Int. Cl.$^4$ ............................................. G11B 7/095
[52] U.S. Cl. ......................................... 369/46; 369/45
[58] Field of Search ................... 250/201; 369/44, 45, 369/46, 112, 122

[56] References Cited

U.S. PATENT DOCUMENTS 4,118,736 10/1978 Okada et al. ......................... 369/122
4,296,316 10/1981 Tsuji et al. ............................ 369/45
4,482,986 11/1984 Noda et al. ........................... 369/44

Primary Examiner—Donald McElheny, Jr.
Attorney, Agent, or Firm—Michael N. Meller

[57] ABSTRACT

An optical head system for accurately detecting the relative positions of a spot of Gaussian beam and a recording track. The optical head system includes an objective lens adapted to be moved in a tracking direction for the tracking of the recording track by the beam spot, a light detector arranged stationary, and movable optical means arranged between the objective lens and the light detector such that the beam spot reflected from the recording track and projected on the light detector through the objective lens is held stationary on the light detector with respect to the movement of the objective lens.

14 Claims, 25 Drawing Figures

OPTICAL HEAD FOR INFORMATION RECORDING APPARATUS

BACKGROUND OF THE INVENTION

1. Field of the Invention

The present invention relates to an optical head for recording information on a recording carrier and playing back the recorded information by optical means.

2. Description of the Prior Art

In known optical heads for recording and/or playing back information signals from a recording carrier in disc or drum form, in order to cause a beam spot to accurately follow an information recording track or tracks formed spirally or concentrically on the surface of a disc or formed helically or coaxially on the surface of a drum, the position of the beam spot relative to the information recording track must always be controlled.

The vibration of the disc or drum in the surface direction during its rotation is one cause of disturbance of the ideal positional relation in which the beam spot is positioned on the recording track in accurate alignment therewith and this results in a tracking error, (radial error) causing the beam spot to deviate from the recording track. Another cause is the vibration of the disc or drum in the vertical direction during its rotation and this results in a focus error (vertical error), causing a distortion in the shape of the beam spot.

The tracking error and the focus error are always detected during the recording and playback operations and are fed back for the purpose of correcting the relative positions of the recording track and the beam spot. Therefore, if the detection of these errors is not effected accurately, it is difficult to ensure the ideal positional relation.

The most common method of detecting the tracking error is the far-field method utilizing the diffracted light from the recording track for reasons of high accuracy and simplicity of the head construction and the usual method of detecting the focus error is a method utilizing the astigmatism of the optical system for the same reasons.

SUMMARY OF THE INVENTION

It is the primary object of the invention to provide an improved optical head.

It is another object of the invention to provide an optical head which has a function of accurately detecting the relative positions of each recording track and a spot of light, particularly a spot formed by a Gaussian beam, and is simple in construction.

It is still another object of the invention to provide an optical head which has a function of always maintaining the positional relation of each recording track and a spot of beam in an ideal relation and is light in weight and simple in adjustment.

In accordance with the invention there is thus provided an optical head comprising an objective lens movable in a tracking direction for the tracking of each recording track by a spot of beam, a light detector fixedly mounted in position and movable optical means arranged between the objective lens and the light detector such that the beam spot reflected from the recording track and projected onto the light detector is made stationary on the light detector relative to the movement of the objective lens.

The movable optical means is moved a given amount in the same direction as the objective lens.

DESCRIPTION OF THE PREFERRED EMBODIMENTS

The principles of tracking error detection and focus error detection will be described first.

Figure 1A:
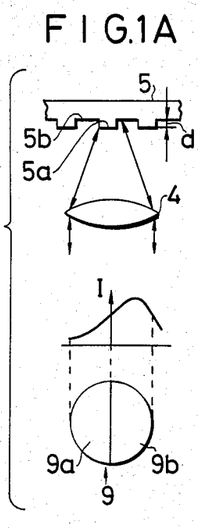
FIGS. 1A to 1C are for explaining the principle of the far-field method, with FIGS. 1A and 1C showing conditions in which a beam spot is deviated from a recording track and FIG. 1B showing a condition in which the beam spot is positioned on the recording track.
Figure 1B:
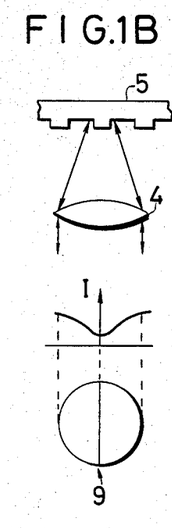
Figure 1C:
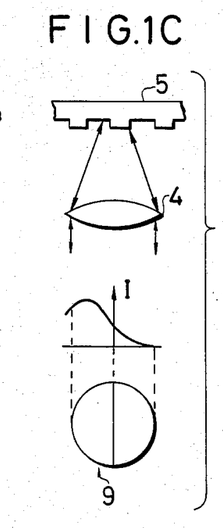

FIGS. 1A–1C and 2 respectively show the principle of tracking error detection and a tracking error detecting circuit. In order to detect a tracking error by the far-field method, which will be described hereunder, it is necessary that a recording carrier or disc 5 be formed with ridges or grooves 5a forming an information track(s). Alternatively, the information track may be in the form of bit strings as in the case of an exclusive playback video disc, digital audio disc or the like. The light beam projected onto the disc 5 by the objective lens 4 is reflected by high-reflectance depressions 5b, passed again through the objective lens 4 and made into a collimated light beam. Since the height of the ridges 5a is about λ/8 in terms of optical path length, where the ridge 5a is present on the optical axis of the objective lens 4 (FIG. 1B), the intensity distribution of the collimated light beam is decreased in intensity in the vicinity of the optical axis due to the interference of the light and the intensity is increased in proportion to the distance from the optical axis. Where the ridge 5a is deviated to the left or right of the optical axis of the objective lens 4, an intensity distribution is produced whose maximum value appears on the right side or the left side of the optical axis as shown in FIG. 1A or 1C. A bisplit detector 9 including a pair of photodiodes 9a and 9b is arranged on the optical path of the collimated light beam. An output 19a from the photodiode 9a and an output 19b from the photodiode 9b are applied to a differential amplifier 100. The amplifier 100 performs the following calculation $$I_{9a} - I_{9b} \tag{1}$$

Figure 3:
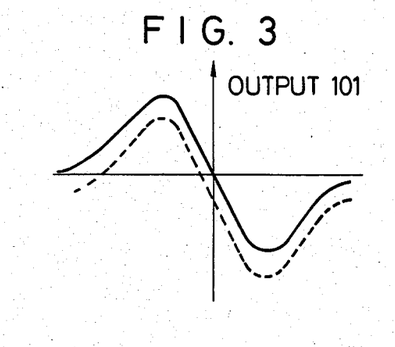
FIG. 3 is a waveform diagram of tracking error signals.

Thus, a signal 101 is generated which varies in accordance with the amount of deviation between the optical axis of the objective lens 4 and the ridge 5a as shown by the solid line in FIG. 3. This signal is a tracking error signal.

Figure 4:
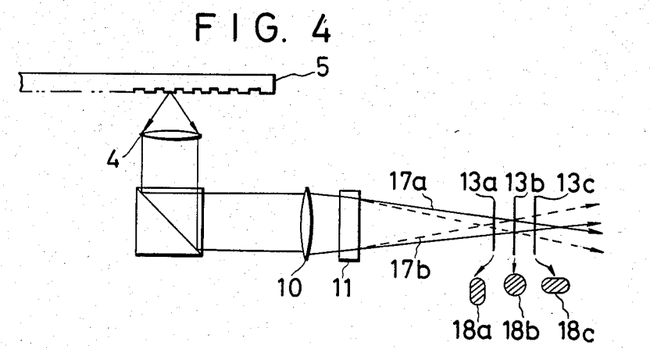
FIG. 4 is a diagram for explaining the principle of the focus error detection.
Figure 5A:
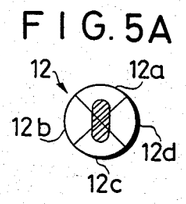
FIGS. 5A to 5C are diagrams showing different shapes of a beam spot on a light detector, with FIGS. 5A and 5C showing "out""of" focus conditions and FIG. 5B showing an in-focus condition.
Figure 5B:
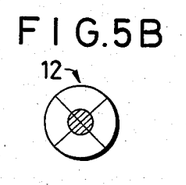
Figure 5C:
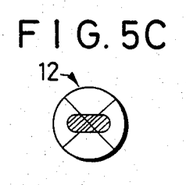
Figure 6:
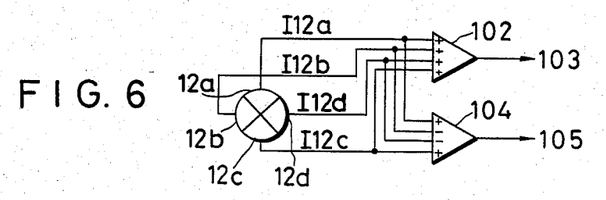
FIG. 6 is a circuit diagram showing a focus error detecting circuit.
Figure 7:
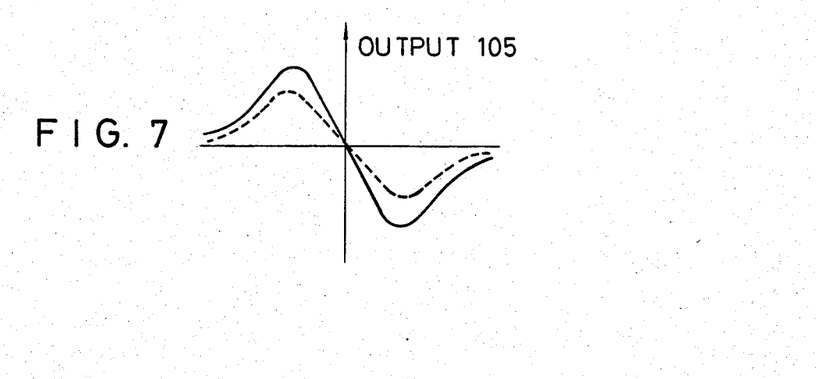
FIG. 7 is a waveform diagram of focus error signals.

Next, the principle of the focus error detection by the astigmatic method will be described with reference to FIG. 4. The light beam reflected as a collimated light beam from a disc 5 is passed through a convex lens 10 and it is then condensed by the astigmatism of a cylindrical lens 11 to different focal lengths as shown by a light beam 17a in the sheet plane and as shown by a light beam 17b in a plane perpendicular to the sheet plane. As a result, spots of shapes as shown at 18a, 18b and 18c are generated at positions 13a, 13b and 13c, respectively. A quadsplit detector 12 including four photodiodes 12a, 12b, 12c and 12d as shown in FIG. 5 is arranged perpendicular to the optical axis at the position 13b where the circle of least confusion occurs. Thus, a light beam is projected onto the detector 12 which has a vertically elongated shape as shown in FIG. 5A when the distance between the objective lens and the disc is smaller than the focal length, a horizontally elongated shape as shown in FIG. 5C when the distance between the objective lens and the disc is greater than the focal length and a circular shape as shown in FIG. 5B when there is an in-focus condition. The circuit of FIG. 6 performs the following calculation on the resulting outputs $I_{12a}$, $I_{12b}$, $I_{12c}$ and $I_{12d}$ from the photodiodes 12a, 12b, 12c and 12d, thus generating a signal corresponding to the focus error as shown by the solid line in FIG. 7:

$$(I_{12a} + I_{12c}) - (I_{12b} + I_{12d}) \tag{2}$$

In FIG. 6, a summing amplifier 102 is an amplifier for producing a sum of the output signals from the photodiodes 12a, 12b, 12c and 12d and its output is a reproduced signal of the information recorded on the disc. Also, an amplifier 104 is provided for performing the previously mentioned calculation of equation (2) and its output 105 is a focus error signal which varies in accordance with the distance between the objective lens and the disc.

The position of the objective lens relative to the recording track is corrected in accordance with the tracking error signal and the focus error signal generated in the above-mentioned manner.

Figure 8:
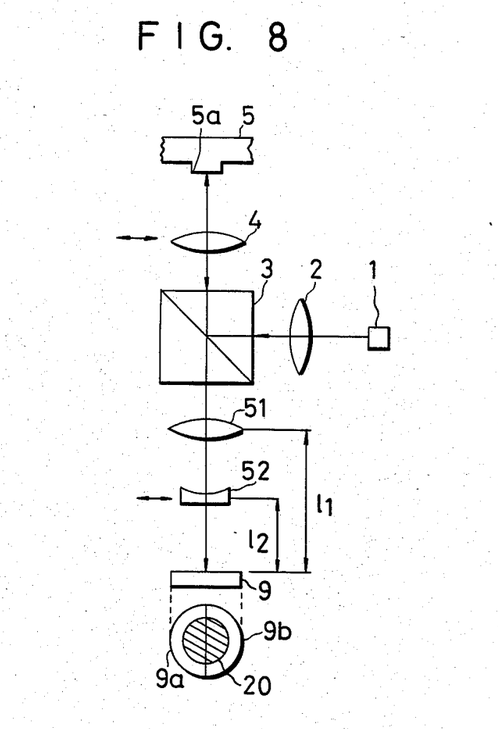
FIG. 8 is an optical path diagram of a tracking error detecting optical system according to an embodiment of the invention.

FIG. 8 shows the construction of a tracking error correcting optical system in an embodiment of the invention.

Figure 2:
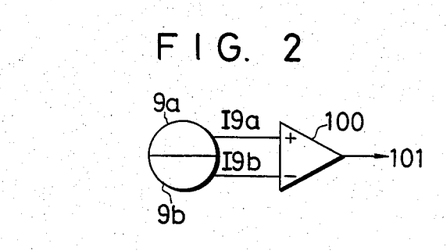
FIG. 2 is a circuit diagram showing a tracking error detecting circuit.
Figure 9:
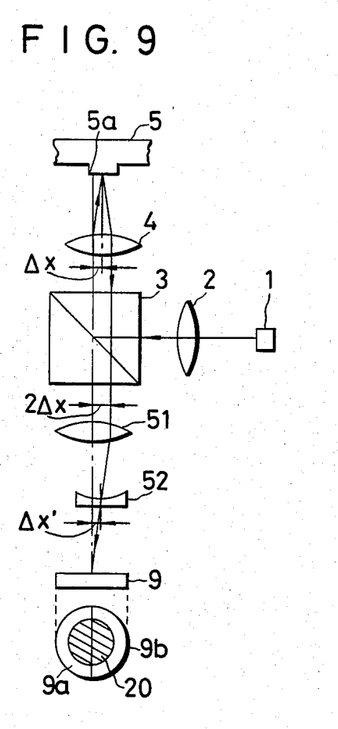
FIG. 9 is a diagram showing an operating condition of the optical system of FIG. 8.

The laser beam radiated from a laser diode 1 is made into a collimated light beam by a collimator lens 2. Generally, this laser beam is not a plane wave but a so-called Gaussian beam whose intensity decreases in proportion to the distance to the optical axis. In the Figure, the maximum intensity light ray in the Gaussian beam is represented as a principal ray. The laser beam made into the collimated light beam is reflected upwardly and projected on an objective lens 4 by a beam splitter 3. The objective lens 4 focuses the laser beam as a tiny spot of 1 to 2 μm in diameter on a rotating disc 5. The reflected light from the disc 5 is again made into a collimated light beam through the objective lens 4 and it is then passed downwardly through the beam splitter 3. The light beam passed through the beam splitter 3 is condensed on a detector 9 through a convex lens 51 and a concave lens 52, thus producing a far-field spot 20.

Where the disc 5 is not eccentric and the recording track is in the proper position with respect to the beam spot, the principal ray of the light beam from the collimator lens 2 reaches the disc 5 along the optical axis of the objective lens 4, is reflected from the disc 5, again propagates along the optical axis of the objective lens 4 and then passes through the beam splitter 3. In this condition, the far-field spot 20 is ideally divided into two parts by the bisplit detector 9. When deviation of position takes place between the far-field spot 20 and the bisplit detector 9, the tracking error signal 101 indicated in FIG. 2 is generated in accordance with the amount of deviation. In response to the tracking error signal 101, a conventional servo-controller (which is well-known but not indicated in the drawing) actuates a tracking drive circuit described below (and shown in FIGS. 16 and 17) and thereby displaces the objective lens 4 by an amount equal to the deviation of the disk from circularity. Where the disc 5 is eccentric so that the information track is moved by an amount Δx, the objective lens 4 is correspondingly moved by the amount Δx, whereby the principal ray of collimated light beam emitted from the objective lens 4 is moved by an amount 2Δx as shown in FIG. 9.

If $f_1$ represents the focal length of the convex lens 51 and $-f_2$ represents the focal length of the concave lens 52, the optical path length $l_1$ between the convex lens 51 and the detector 9 and the optical path length $l_2$ between the concave lens 52 and the detector 9 are selected as follows $$l_1 = f_1, \quad l_2 = f_2 \tag{3}$$

If the objective lens 4 is displaced by Δx, then the principal ray of the light beam reflected from the disc 5 is displaced by the following amount at the position of the concave lens 52

$$\Delta x' = k(l_2/l_1)\Delta x \tag{4}$$

Here, k is the ratio of the displacement of the reflected light to the displacement of the objective lens 4 (e.g., $2\Delta x/\Delta x = 2$). Therefore, where the objective lens 4 is moved by Δx, if the concave lens 52 is optically moved by the amount Δx' given by the equation (4) in the same direction within the same plane, the principal ray passes through the center of the concave lens 52 so that the principal ray is not subjected to the action of the concave lens 52 and it is passed straightly and projected onto the detector 9. On the other hand, the optical path length between the convex lens 51 and the detector 9 has the relation of equation (3) and therefore the principal ray always falls onto a fixed position of the detector 9 irrespective of the movement of the objective lens 4. In other words, the far-field spot 20 is not moved if the concave lens 52 is moved in accordance with equation (4). If the concave lens 52 is not moved, then spot 20 will be moved and thus the tracking error signal becomes as shown by the broken line in FIG. 3. As will be seen from the equation (4), the amounts of movement of the lens 4 and 52, which are moved in association, can be selected arbitrarily within the range of $(\Delta x'/\Delta x)=0-2$.

Figure 10:
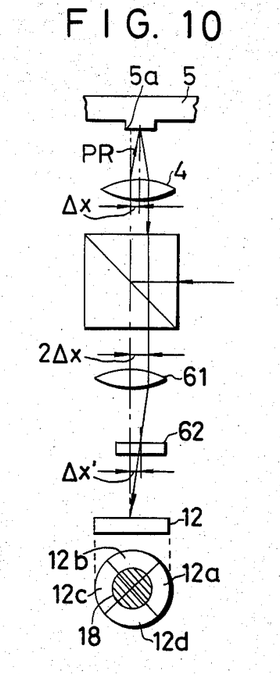
FIG. 10 is a diagram showing the principle of applying the optical system of FIG. 8 to the focus error detection.

This tracking error detecting system is also applicable to the detection of a focus error by the astigmatic method. In FIG. 10, a convex lens 61 and a plano-concave cylindrical lens 62 form a spherical and cylindrical lens system as in the case of the lens 10 and 11 of FIG. 4. A detector 12 is arranged at a position such that the circle of least confusion produced between the two focal lines of the spherical and cylindrical lens system is formed on the photosensitive surface of the detector 12. Let it be assumed that $l_{11}$ represents the distance between the principal point of the convex lens 61 and one of the focal points of the spherical and cylindrical lens system and $l_{12}$ represents the distance between the center of the plano-concave cylindrical lens 62 and said one focal point. In this case, this focal point is selected to be equal to the focal point of the convex lens 61. Then, if the objective lens 4 is displaced by $\Delta x$, the principal ray is displaced at the position of the plano-concave cylindrical lens 62 by the following amount $$\Delta x' = 2(l_{12}/l_{11})\Delta x \qquad (5)$$

In this case, by moving the plano-concave cylindrical lens 62 in association with the tracking displacement of the objective lens 4 so as to satisfy the equation (5), it is possible to suppress to some extent the movement of the circle of least confusion on the photosensitive surface of the detector 12. However, it is impossible to make the circle of least confusion completely stationary. The reason is that the photosensitive surface of the detector 12 is not positioned on the focal plane of the convex lens 61.

Figure 11:
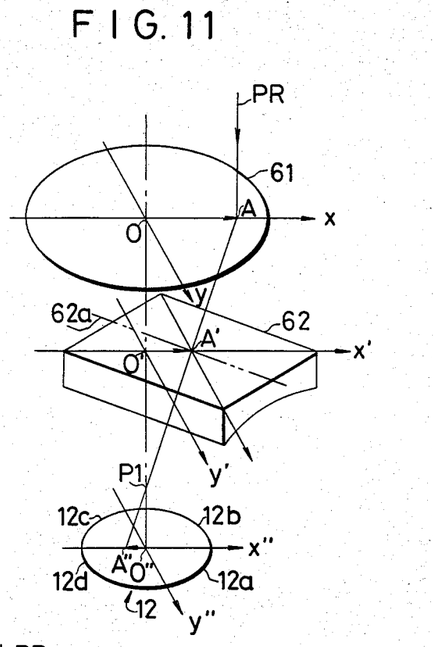
FIG. 11 is a perspective optical path diagram showing the positional relation of the principal ray and the detector of FIG. 10.

This condition will now be described with reference to FIG. 11. In the Figure, with the optical axis of the optical system as the origin, the directions of orthogonal axes $x-y$, $x'-y'$ and $x''-y''$ are the same as the dividing directions of the detector 12 and the x axis is selected as the direction of movement of the principal ray in FIG. 10. The movement of the objective lens 4 by $\Delta x$ causes the principal ray to fall at a point A of the convex lens 62. In this case, the cylindrical lens 61 is also moved by $\Delta x' = \Delta x$ and therefore the principal ray falls on a point A' of the cylindrical lens 62 (the point of intersection with the generatrix 62a of the cylindrical lens 62 inclined at an angle of 45° with respect to the x' and y' axes). Then, the principal ray falls on a point A'' of the detector 12 through the focal point $P_1$ of the convex lens 61. Therefore, when the objective lens 4 makes a tracking displacement, the light beam on the detector 12 is displaced from the ideal position in the direction of the x'' axis. As a result, the values of $I_{12a}+I_{12c}$ and $I_{12b}+I_{12d}$ indicated by equation (2) are varied by the tracking displacement of the objective lens 4 and the sensitivity of the focus error detection is deteriorated. In other words, the slope of the focus error signal is decreased as shown by the broken line in FIG. 7. This phenomenon is caused by the fact that the circle of least confusion in the in-focus condition is not formed on the focal plane of the convex lens 61.

Figure 12:
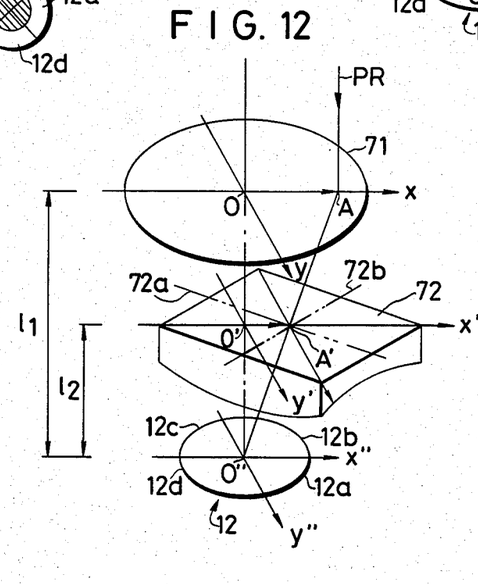
FIG. 12 is a diagram showing the optical arrangement of another embodiment of the invention.

Therefore, in the embodiment shown in FIG. 12, a toric lens is used in place of a cylindrical lens. A toric lens 72 is arranged between a convex lens 71, having a focal length $f_{71}$ and similar to the previously mentioned lens 61, and a detector 12. The toric lens 72 has a focal length $f_{72}$ in a plane (a plane S) containing a generatrix 72a and the toric lens optical axis and it has a focal length $-f_{72}$ in a plane (a plane m) containing a generatrix 72b and the toric lens optical axis (where the absolute values of $f_{72}$ and $-f_{72}$ are the same).

By so doing, the circle of least confusion is formed on the focal plane of the convex lens 71 and also focal lines perpendicular to each other are formed before and behind the focal plane. In other words, the concave cylindrical lens action of the toric lens 72 is such that a focal line is formed in the rear of the focal plane of the convex lens 71 with respect to the light beam incident to a place apart from the generatric 72a and its convex cylindrical lens action produces a focal line in the front of the focal plane of the convex lens 71 with respect to the light beam incident to a place apart from the generatrix 72b. As a result, the circle of least confusion is formed on the focal plane of the convex lens 71 as mentioned previously. Thus, assuming that $l_1$ represents the distance between the principal point 0 of the convex lens 71 and the center 0'' of the photosensitive surface of the detector 12 and $l_2$ represents the distance between the center or the principal point 0'' of the toric lens 72 and the center 0'' of the photosensitive surface, the toric lens 72 is moved in the same direction as the tracking displacement of the objective lens 4 so as to satisfy the equation (4). By so doing, the circle of least confusion on the photosensitive surface is made independent of the displacement of the objective lens 4 and it is held stationary at the same position.

Then, the focus error signal is calculated from the outputs $I_{12a}$ to $I_{12d}$ of the detector 21.

Note that the detection of a tracking error signal can be effected by this astigmatic method. In other words, it is only necessary to add up the outputs of the photodiodes 12b and 12c and the outputs of the photodiodes 12a and 12d, respectively, and subject the resulting sum outputs $(I_{12b}+I_{12c})$ and $(I_{12a}+I_{12d})$ to differential amplification.

Figures 13, 14, 15:
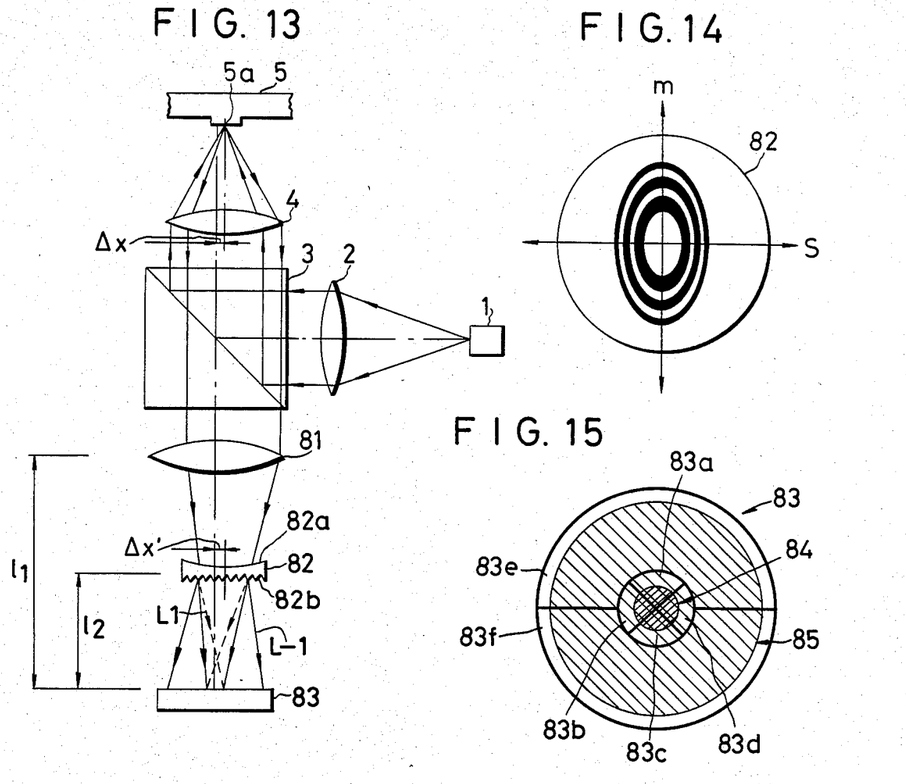
FIG. 13 is a diagram showing the optical arrangement of still another embodiment of the invention.
FIG. 14 is a diagram for explaining a holographic lens.
FIG. 15 is a plan view of the detector shown in FIG. 13.

FIG. 13 shows another embodiment of the invention in which a holographic lens is used in place of a toric lens.

The light beam reflected from an information track 5a is passed through an objective lens 4 and a beam splitter 3 and directed toward a detector 83. A convex lens 81 and a holographic lens 82 are arranged between the beam splitter 3 and the detector 83. The holographic lens 82 is formed with a concave surface 82a and a hologram surface 82b. The holographic lens 82 is moved within the same plane in accordance with a tracking displacement of the objective lens 4. The hologram surface 82b produces a convergent beam having astigmatism with respect to a reference plane wave vertically incident to it. As a result, when the reflected collimated light beam from the disc surface is projected onto the holographic lens 82, a convergent beam having astigmatism is emitted as a plus first-order beam $L_1$ and also a far-field pattern by a minus first-order beam $L_{-1}$ is formed on the photosensitive surface of the detector 83.

The holographic lens 82 is of a type so that, as shown in FIG. 14, for example, the focal length of the plus first-order beam within a plane S is $f_H - \Delta f$ and the focal length of the plus first-order beam within a plane m is $f_H + \Delta f$ (where $f_H$ is the average focal length). Then, if $f_{81}$ represents the focal length of the convex lens 81, $-f_{82}$ the focal length of the concave surface 82a of the holographic lens 82, $l_1$ the optical path length from the principal point of the convex lens 81 to the photosensitive surface of the detector 83 and $l_2$ the optical path length from the principal point of the holographic lens 82 to the photosensitive surface of the detector 83, the following relations hold time:

$$l_1 = f_{81}, \quad l_2 = f_{82} = f_H \tag{6}$$

Thus, the hologram surface 82b of the holographic lens 82 has the function of producing the circle of least confusion on the photosensitive surface of the detector 83 in the in-focus condition and also producing two orthogonal focal lines before and behind the circle of least confusion.

Then, with respect to the tracking displacement $\Delta x$ of the objective lens 4, the holographic lens 82 is moved in the same direction as the direction of displacement of the objective lens 4 within the same plane optically so as to satisfy equation (4). As a result, even if the objective lens 4 makes a tracking displacement, the beam spot formed on the photosensitive surface of the detector 83 is not displaced.

In this embodiment, the concave surface 82a having the focal length $(-f_H)$ is provided to cancel the average focal length $f_H$ of the plus first-order beam from the holographic lens 82. However, considering the fact that a holographic lens functions as a lens which divides the incident beam into light beams of a plurality of orders, that is, a lens having a plurality of focal lengths, various modifications are possible. For instance, by arranging so that the holographic lens 82 produces the circle of least confusion with the minus first-order beam, it is possible to replace the concave surface 82a with a convex surface having the focal length $f_H$ so as to cancel the average focal length $(-f_H)$ of the minus first-order beam. By so doing, it is possible to produce the equivalent circle of least confusion to that of the present embodiment and it is also possible to produce the far-field pattern with a minus third-order beam.

The detector 83 may be constructed as shown in FIG. 15. A first photoelectric sensor for generating an output for focus error detecting purposes is arranged centrally and a second photoelectric sensor for generating an output for tracking error detecting purposes is arranged on the outer periphery of the first photoelectric sensor to be integral therewith. The first photoelectric sensor includes four photodiodes 83a to 83d. The second photoelectric sensor includes two photodiodes 83e and 83f. The photodiodes 83a to 83d and the photodiodes 83e and 83f respectively correspond to the photodiodes 12a to 12d and the photodiodes 9a and 9b shown in FIGS. 5 and 1, respectively. When a far-field spot 85 is formed on the photosensitive surfaces of the first and second photoelectric sensors, the signal corresponding to the photosensitive surface of the photodiodes 83e and 83f is taken out for tracking error detecting purposes. Also, a beam spot 84 producing the circle of least confusion is received only by the photodiodes 83a to 83d. While the outputs of the photodiodes 83a to 83d are equally level-shifted by the far-field beam spot 85, these outputs correspond to the light information of the beam spot 84. The calculation $(I_{83a} + I_{83c}) - (I_{83b} + I_{83d})$ similar to the previously mentioned equation (2), is performed on the outputs $I_{83a}$ to $I_{84d}$ from the photodiodes 83a to 83d of the first photoelectric sensor, thus producing the positive and negative outputs corresponding to the focusing condition and in accordance with the outputs the objective lens 4 is moved in a direction perpendicular to the disc, thereby effecting the focusing.

Also, the reproduced signal of the recorded information can be obtained by producing a sum of the outputs from the photodiodes 83a to 83d.

On the other hand, the photodiodes 83e and 83f of the second photoelectric sensor receive the minus first-order beam $L_{-1}$. The resulting outputs $I_{83e}$ and $I_{83f}$ are differentially amplified in the like manner as in equation (1) so that in accordance with the resulting output, the objective lens 4 and the holographic lens 82 are moved in the radial direction of the disc in the previously mentioned manner and the tracking is effected. In this way, the tracking mechanism by the far-field method is provided.

The dividing pattern of the photosensitive surface of the second photoelectric sensor in the detector 83 is not limited to the illustrated embodiment and it is only necessary that the dividing direction of the photosensitive surface lie in a direction inclined at 45° with respect to the S or m direction of the holographic lens 82.

Next, a mechanism for displacing the objective lens 4 and the concave lens 52, the toric lens 72 or the holographic lens 82 in the same direction will be described.

Figure 16:
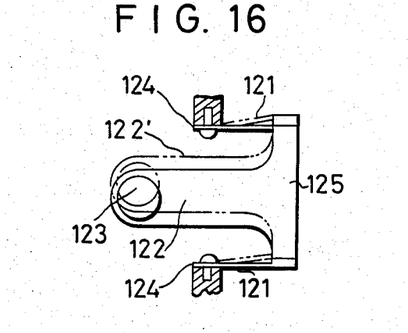
FIG. 16 is a plan view showing an embodiment of an optical system supporting structure.
Figure 17:
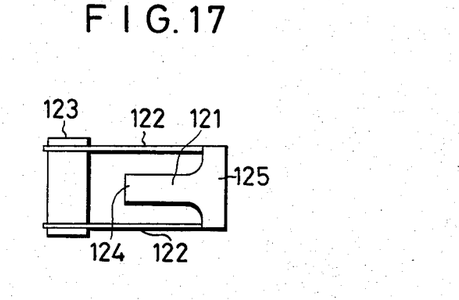
FIG. 17 is a side view of FIG. 16.

In FIGS. 16 and 17, a tracking parallel spring 121 consists of two plate springs each of which has its one end 124 fixed to a fixed support member, thus forming a fixed end. The other end is coupled through a coupling member 125 to form a moving end, and the two plate springs are held parallel to each other. Arranged perpendicularly to the tracking parallel spring 121 is a focusing parallel spring 122 having its one end connected to the coupling member 125 and its other end connected to an objective lens barrel 123. With this construction, when the lens barrel 123 is moved in the tracking direction, the tracking parallel spring 121, the focusing parallel spring 122 and the coupling member 125 are parallelly moved in the tracking direction by the same amount as the lens barrel 123 about the fixed ends of the tracking parallel spring as support points as shown by a phantom line 122'.

As a result, by attaching with an adhesive or the like any of the optical members, i.e., the concave lens 52, the toric lens 72 or the holographic lens 82, to the coupling member 125, even if the objective lens 4 within the lens barrel 123 is moved in the tracking direction, the optical member 52, 72 or 82 is moved in the same direction by following the displacement of the objective lens 4. In this embodiment, $\Delta x = \Delta x'$ and therefore it is necessary to select $l_1 = 2l_2$, that is, $f_{71} = 2|f_{72}|$ or $f_{81} = 2|f_{82}|$.

Figure 18A:
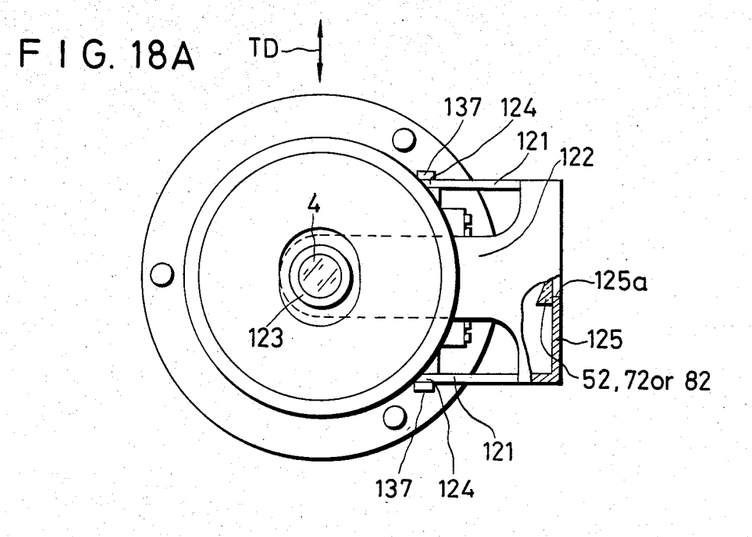
FIGS. 18A and 18B show an embodiment of an optical head system, with FIG. 18A showing a partially cutaway plan view and FIG. 18B showing a side sectional view.
Figure 18B:
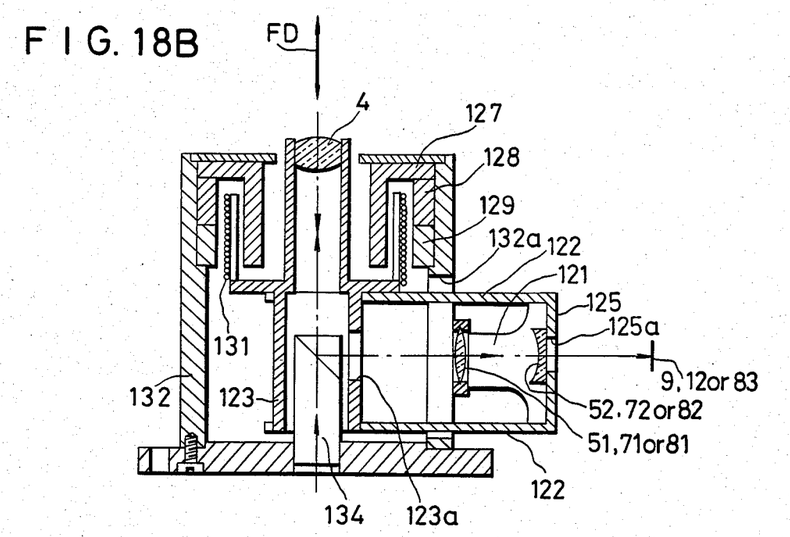

FIGS. 18A and 18B show the construction of another embodiment of the optical head incorporating the abovementioned displacing mechanism.

The fixed ends 124 of the tracking parallel spring 121 are fastened to a housing 132 with fastening screws 137. The optical member 52, 72 or 82 is attached to the inner wall of the coupling member 125 with an adhesive or the like. The focusing parallel spring 122 is passed through an opening 132a of the housing 132 and its end portion is attached to the lens barrel 123. The objective lens 4 is inserted into the forward end portion of the lens barrel 123 and a beam splitter 134 fixed to a base is inserted into the lower portion of the lens barrel 123. The beam splitter 134 serves the function of directing the laser beam to the objective lens 4 and directing the reflected light from the objective lens 4 to the optical member 52, 72 or 82 through an opening 123a of the lens barrel 123 and through the convex lens 51, 71 or 81. This reflected beam is passed through an opening 125a of the coupling member 125 and projected onto the detector 9, 12 or 83.

The convex lens 51, 71 or 81 is fixedly mounted in the housing 132.

A coil 131 is wound on the outer surface of the lens barrel 123 and a ring-shaped yoke 127 is inserted between the coil 131 and the outer peripheral wall of the lens barrel 123. A permanent magnet 128 and a yoke 129 are arranged on the outer side of the coil 131. The permanent magnet 128 and the yoke 129 are fixedly mounted on the inner wall of the housing 132. These elements form a focusing drive circuit so that when an energizing current is supplied to the coil 131, an electromotive force acts between the coil 131 and the permanent magnet 128 and the lens barrel 123 integral with the coil 131 or the objective lens 4 is moved in the focusing direction FD. While the drive for the tracking direction TD is not shown, there is provided a tracking drive circuit which is perpendicular to the focusing coil 131.

Figure 19A:
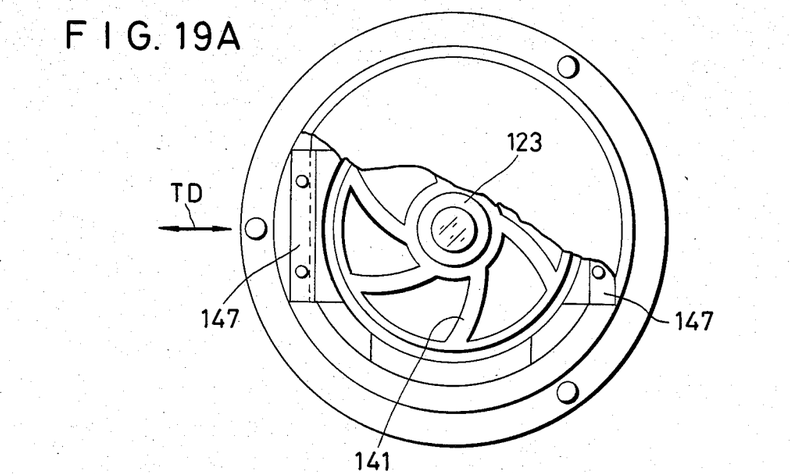
FIGS. 19A and 19B show another embodiment of the optical head system, with FIG. 19A showing a partially cutaway plan view and FIG. 19B showing a side elevational view.
Figure 19B:
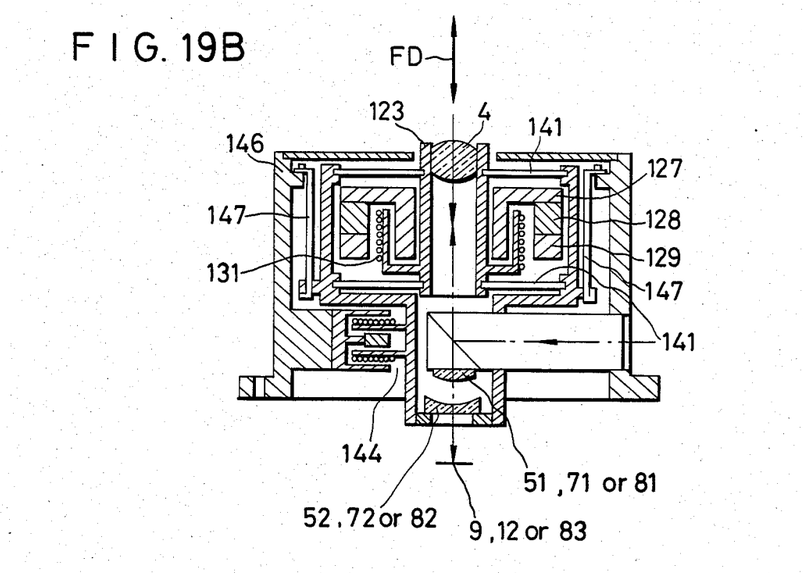

FIGS. 19A and 19B show another embodiment of the displacing mechanism. An objective lens barrel 123 is fixedly mounted centrally in a pair of top and bottom crown springs 141 each having its outer periphery mounted fixedly within a cylindrical inner housing 143. The crown springs 141 form a focusing parallel spring. A focusing drive mechanism including a coil 131, yokes 128 and 129 and a permanent magnet 128, which are similar to those of FIG. 18B, is fixedly mounted at a position between the pair of crown springs 141 within an outer housing 146.

The inner housing 143 and the outer housing 146 are connected together by a pair of plate springs 147. The plate springs 147 are arranged symmetrically with respect to the center of the inner housing 143. The springs 147 form a tracking parallel spring. The optical member 52, 72 or 82 is fixedly mounted on the bottom portion of the inner housing 143.

Mounted between the inner and outer housings 143 and 146 is a tracking drive mechanism 144 including members similar to the focusing drive mechanism, and the inner housing 143 and the objective member 4 of the lens barrel 123 are moved in the tracking direction TD. A beam splitter 142 is fixed to the outer housing 146 and slidably fitted into the inner housing 143. The convex lens 51, 71 or 81 is fixedly supported on the beam splitter 142 at a position facing the detector 9, 12 or 83.

Thus, when the inner housing 143 is moved by the tracking drive mechanism so that the objective lens 4 of the lens barrel 123 is moved, the springs 147 are displaced and the objective lens 4 and the optical member 52, 72 or 82 are moved in the tracking direction TD by the same amount.

On the other hand, in order to control the movement of the objective lens 4 in the focusing direction FD through the focusing drive mechanism, the crown springs 141 are displaced in the like manner as in the case of the springs 147, thereby effecting the control.

What is claimed is:

1. An optical head for recording and/or reading information from at least one information recording track on a recording carrier comprising:
   (a) means for producing a beam of radiation;
   (b) objective lens means for condensing said beam of radiation on said recording track, said objective lens means being positioned to pass therethrough said beam of radiation reflected from said recording track;
   (c) first optical means arranged stationary to condense said beam reflected from said recording track and passed through said objective lens means on a predetermined plane;
   (d) means having a detection plane coincident with said predetermined plane and positioned stationary to detect said beam;
   (e) second optical means arranged between said first optical means and said detecting means to diverge said beam from said first optical means; and
   (f) drive means responsive to said detecting means to displace said objective lens means and said second optical means in the same direction so as to satisfy the following equation:

$$\Delta x' = k(l_2/l_1)\Delta x$$

where $l_1$ = the optical path length between said first optical means and said predetermined plane, $l_2$ = the distance between said second optical means and said predetermined plane, $\Delta x$ = the amount of displacement of said objective lens means, $\Delta x'$ = the amount of displacement of said second optical means and k = a constant.

2. An optical head according to claim 1, wherein said detecting means is responsive to the intensity distribution of said beam on said detection plane to generate a first and second output signal varying relative to each other.

3. An optical head according to claim 1, wherein said drive means displaces each of said objective lens means and said second optical means in a direction substantially perpendicular to the optical axis thereof.

4. An optical head according to claim 1, wherein said first optical means includes positive-power lens means having a focal length equal to said optical path length $l_1$ to said predetermined plane, and wherein said second optical means includes negative-power lens means having a focal length equal to said optical path length $l_2$ to said predetermined plane.

5. An optical head according to claim 1, further comprising a supporting means coupled to said drive means, said supporting means including a first pair of plate springs each arranged stationary at one end thereof and movably at the other end thereof and said second pair of plate springs being arranged with opposing surfaces, and a coupling member connecting said other ends of said first pair of plate springs so as to maintain said plate springs in parallel relationship, said coupling member being movable in a direction substantially perpendicular to said opposing surfaces of said first pair of plate springs, wherein said objective lens means and said second optical means are supported on said coupling member such that the optical axes of said objective lens means and said second optical means are maintained vertically with respect to the direction of movement of said coupling member.

6. An optical head according to claim 5, wherein said supporting means further includes a second pair of parallel plate springs each having one end thereof coupled to said coupling member and the other end thereof coupled to said objective lens means and having a surface perpendicular to said opposing surfaces of said first pair of plate springs, and wherein said objective lens means is moved in a direction substantially perpendicular to said surfaces of said second pair of plate springs so as to effect focussing.

7. An optical head for recording and/or reading information from at least one information recording track on a recording carrier comprising:
   (a) means for producing a beam of radiation;
   (b) objective lens means for condensing said beam of radiation on said recording track, said objective lens means being positioned to pass therethrough said beam of radiation reflected from said recording track;
   (c) first optical means arranged stationary to condense said beam reflected from said recording track and passed through said objective lens means on a predetermined plane;
   (d) means having a detection plane coincident with said predetermined plane and positioned stationary to detect said beam;
   (e) second optical means arranged between said first optical means and said predetermined plane and having a positive and negative power with respect to a first and second direction perpendicular to each other within a plane perpendicular to the optical axis thereof, said second optical means being arranged such that said beam passing through said second optical means forms the circle of least confusion on said predetermined plane when the distance between said recording track and said objective lens means is equal to the focal length of said objective lens means; and
   (f) drive means responsive to said detecting means to displace said objective lens means and said second optical means in the same direction so as to satisfy the following equation $$\Delta x' = k(l_2/l_1)\Delta x$$

where $l_1$ = the optical path length between said first optical means and said predetermined plane, $l_2$ = the distance between said second optical means and said predetermined plane, $\Delta x$ = the amount of displacement of said objective lens means, $\Delta x'$ = the amount of displacement of said second optical means and k = a constant.

8. An optical head according to claim 7, wherein said second optical means includes toric lens means having a first and second focal length of the same absolute value.

9. An optical head according to claim 8, wherein said absolute value of the focal lengths of said toric lens means is equal to the absolute value of said optical path length $l_2$ to said predetermined plane.

10. An optical head according to claim 7, wherein said second optical means includes holographic lens means having a negative power and forming a hologram.

11. An optical head for recording and/or reading information from at least one information recording track on a recording carrier comprising:
   (a) means for producing a beam of radiation:
   (b) objective lens means for condensing said beam of radiation on said recording track, said objective lens means being positioned to pass therethrough said beam of radiation reflected from said recording track:
   (c) first optical means fixedly arranged to condense said beam reflected from said recording track and passed through said objective lens means on a predetermined plane;
   (d) means having a detection plane coincident with said predetermined plane and fixedly arranged to detect said beam:
   (e) second optical means arranged between said first optical means and said detecting means for producing the circle of least confusion on said predetermined plane from said beam passing through said second optical means when the distance between said recording track and said objective lens means is equal to the focal length of said objective lens means; and
   (f) drive means responsive to said detecting means to displace said objective lens means and said second optical means in the same direction.

12. An optical head according to claim 11, wherein said drive means displaces said objective lens means and said second optical means so as to satisfy the equation:

$$\Delta x' = k(l_2/l_1)\Delta x$$

where $l_1$ is the optical path length between said first optical means and said predetermined plane, $l_2$ is the distance between said second optical means and said predetermined plane, $\Delta x$ is the amount of displacement of said objective lens means, $\Delta x'$ is the amount of displacement of said second optical means, and k is a constant.

13. An optical head according to claim 12, further comprising a supporting means coupled to said drive means, said supporting means including a first pair of plate springs each fixedly arranged at one end thereof and movably arranged at the other end thereof, and said second pair of plate springs being arranged with opposing surfaces, and a coupling member connecting said other ends of said first pair of plate springs so as to maintain said plate springs in parallel relationship, said coupling member being movable in a direction substantially perpendicular to said opposing surfaces of said first pair of plate springs, wherein said objective lens means and said second optical means are supported on said coupling member such that the optical axis of said objective lens means and said second optical means are maintained vertically with respect to the direction of movement of said coupling member.

14. An optical head according to claim 13, wherein said supporting means further includes a second pair of parallel plate springs, each having one end thereof coupled to said coupling member and the other end thereof coupled to said objective lens means and having a surface perpendicular to said opposing surfaces of said first pair of plate springs, and wherein said objective lens means is moved in a direction substantially perpendicular to said surfaces of said second pair of plate springs so as to effect focusing.

* * * * *